(12) United States Patent
Inagaki

(10) Patent No.: US 10,270,525 B2
(45) Date of Patent: Apr. 23, 2019

(54) INFORMATION PROCESSING APPARATUS AND A METHOD OF DETERMINING WHETHER OR NOT TO TRANSMIT FAILURE INFORMATION

(71) Applicant: FUJITSU LIMITED, Kawasaki-shi, Kanagawa (JP)

(72) Inventor: Takanori Inagaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/893,893

(22) Filed: Feb. 12, 2018

(65) Prior Publication Data

US 2018/0241466 A1 Aug. 23, 2018

(30) Foreign Application Priority Data

Feb. 22, 2017 (JP) .................................. 2017-031057

(51) Int. Cl.
| | | |
|---|---|---|
| H04B 10/00 | (2013.01) | |
| H04B 10/07 | (2013.01) | |
| H04L 12/24 | (2006.01) | |
| H04B 10/43 | (2013.01) | |
| H04B 10/035 | (2013.01) | |
| H04B 10/03 | (2013.01) | |
| H04J 14/00 | (2006.01) | |

(52) U.S. Cl.
CPC ............ *H04B 10/07* (2013.01); *H04B 10/03* (2013.01); *H04B 10/035* (2013.01); *H04B 10/43* (2013.01); *H04L 41/069* (2013.01); *H04L 41/06* (2013.01)

(58) Field of Classification Search
CPC .... H04B 10/03; H04B 10/07; H04B 10/0773; H04B 10/0793; H04J 14/0267; H04J 14/0272

See application file for complete search history.

(56) References Cited

U.S. PATENT DOCUMENTS

2013/0142511 A1* 6/2013 Spraggs .............. H04J 14/0267
398/51
2015/0071303 A1* 3/2015 Tajima .................... H04L 69/14
370/433

FOREIGN PATENT DOCUMENTS

| JP | 3-213023 | 9/1991 |
|---|---|---|
| JP | 5-95357 | 4/1993 |
| JP | 7-147574 | 6/1995 |
| JP | 2003-229820 | 8/2003 |
| JP | 2007-333985 | 12/2007 |

\* cited by examiner

*Primary Examiner* — Daniel G Dobson
(74) *Attorney, Agent, or Firm* — Fujitsu Patent Center

(57) ABSTRACT

An information processing apparatus includes an optical transceiver configured to return an optical signal received by a first channel to a second channel at a time of immediate power disconnection of a casing accommodating nodes; a memory; and a processor coupled to the memory, wherein the processor detects an occurrence of a failure in inter-node communications with an external node, when the occurrence of a failure is detected, the processor controls the optical transceiver in order to emit light to the first channel, makes a determination as to whether or not the second channel is enabled to receive the optical signal, and determines whether or not a power source of the external node is off based on the determination, and when the power source of the external node is off, the processor selects a failure notification to transmit to a failure management device.

17 Claims, 15 Drawing Sheets

INFORMATION PROCESSING APPARATUS AND A METHOD OF DETERMINING WHETHER OR NOT TO TRANSMIT FAILURE INFORMATION

CROSS-REFERENCE TO RELATED APPLICATION

This application is based upon and claims the benefit of priority of the prior Japanese Patent Application No. 2017-031057, filed on Feb. 22, 2017, the entire contents of which are incorporated herein by reference.

FIELD

The embodiments discussed herein are related to an information processing apparatus, and a method of determining whether or not to transmit failure information.

BACKGROUND

In a supercomputer system having a configuration in which a casing accommodating a large number of computers called nodes is coupled to a network called an interconnect, if a failure occurs, failure information is transmitted to a server that manages failure information of the entire system. In particular, if an immediate power disconnection occurs in a casing in a system, failures are detected in a large number of casings that are coupled to a casing where the immediate power disconnection has occurred, and thus a large amount of failure information is transmitted to the server. In the server, processing on the collected failure information, for example populating a database by failure information, or the like is performed. With such a configuration, a high load is imposed on the server and the network. Japanese Laid-open Patent Publication Nos. 5-95357 and 7-147574 disclose techniques for realizing reduction of loads on a server and a network.

However, it is not possible to reduce a high load that occurs in a server and on a network at the time of an immediate power disconnection by the techniques disclosed in Japanese Laid-open Patent Publication Nos. 5-95357 and 7-147574.

SUMMARY

According to an aspect of the embodiments, an information processing apparatus includes an optical transceiver configured to return an optical signal received by a first channel to a second channel at a time of immediate power disconnection of a casing accommodating nodes; a memory; and a processor coupled to the memory, wherein the processor detects an occurrence of a failure in inter-node communications with an external node, when the occurrence of a failure is detected, the processor controls the optical transceiver in order to emit light to the first channel, makes a determination as to whether or not the second channel is enabled to receive the optical signal, and determines whether or not a power source of the external node is off based on the determination, and when the power source of the external node is off, the processor selects a failure notification to transmit to a failure management device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following, a description will be given of embodiments of the present disclosure with reference to the drawings. First, a description will be given of a supercomputer in which an information processing apparatus according to the embodiments is implemented with reference to FIG. 12. A supercomputer 120 has a configuration in which a large number of computers called nodes are coupled to a network called an interconnect. An interconnect refers to coupling a semiconductor chip and an electronic circuit and enabling signals and data to be transmitted and received with each other. In this regard, a node mentioned here is a computer on which, for example, a central processor unit (CPU) and a memory is mounted, and a plurality of nodes are included in one casing 121.

Figure 12:
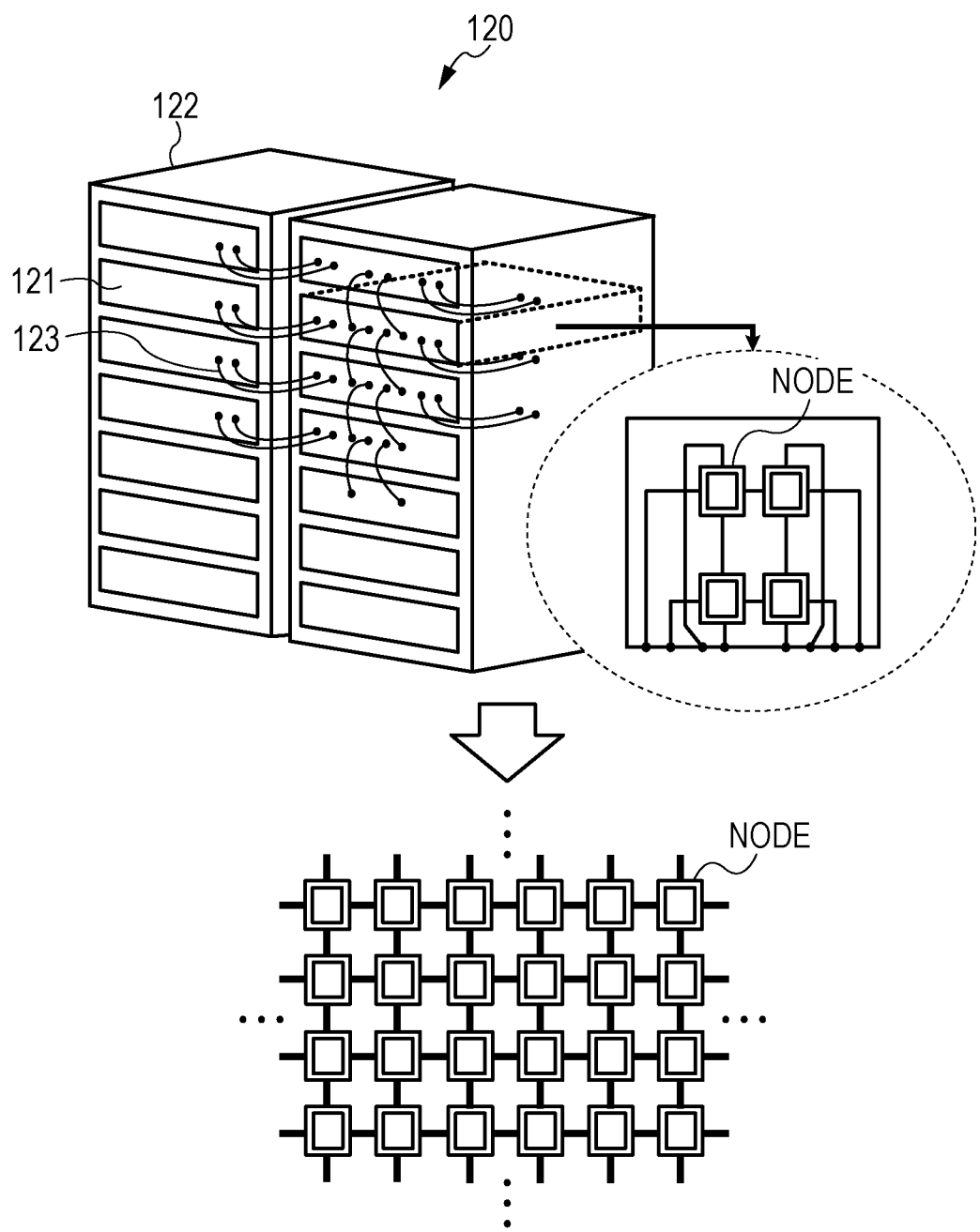
FIG. 12 is a diagram illustrating an example of a supercomputer system.

In the example in FIG. 12, four nodes among the nodes mounted in the casing 121 are illustrated in a circular frame.

Each node transmits and receives signals and data to and from the nodes mounted in the casings disposed at the upper, the lower, the rightward, and the leftward positions of the casing where each node is mounted in addition to the nodes in the same casing where each node is mounted via interconnect cables 123.

As a physical configuration of the supercomputer 120, for example, a plurality of rack-mounted casings (about tens of) are mounted in a rack 122, and each of the casings 121 is coupled via interconnect cables 123. The nodes mounted in the casings 121 exchange signals and data with each other via interconnect cables 123. The coupling structure of nodes is not limited to a mesh structure, and other coupling structures may be employed if a node is capable of coupling to other nodes via optical modules.

The communications via an interconnect are controlled by a controller called an interconnect controller (ICC) in a node. An ICC is, for example, a large scale integration (LSI, a large-scale integrated circuit), or the like.

Figure 13:
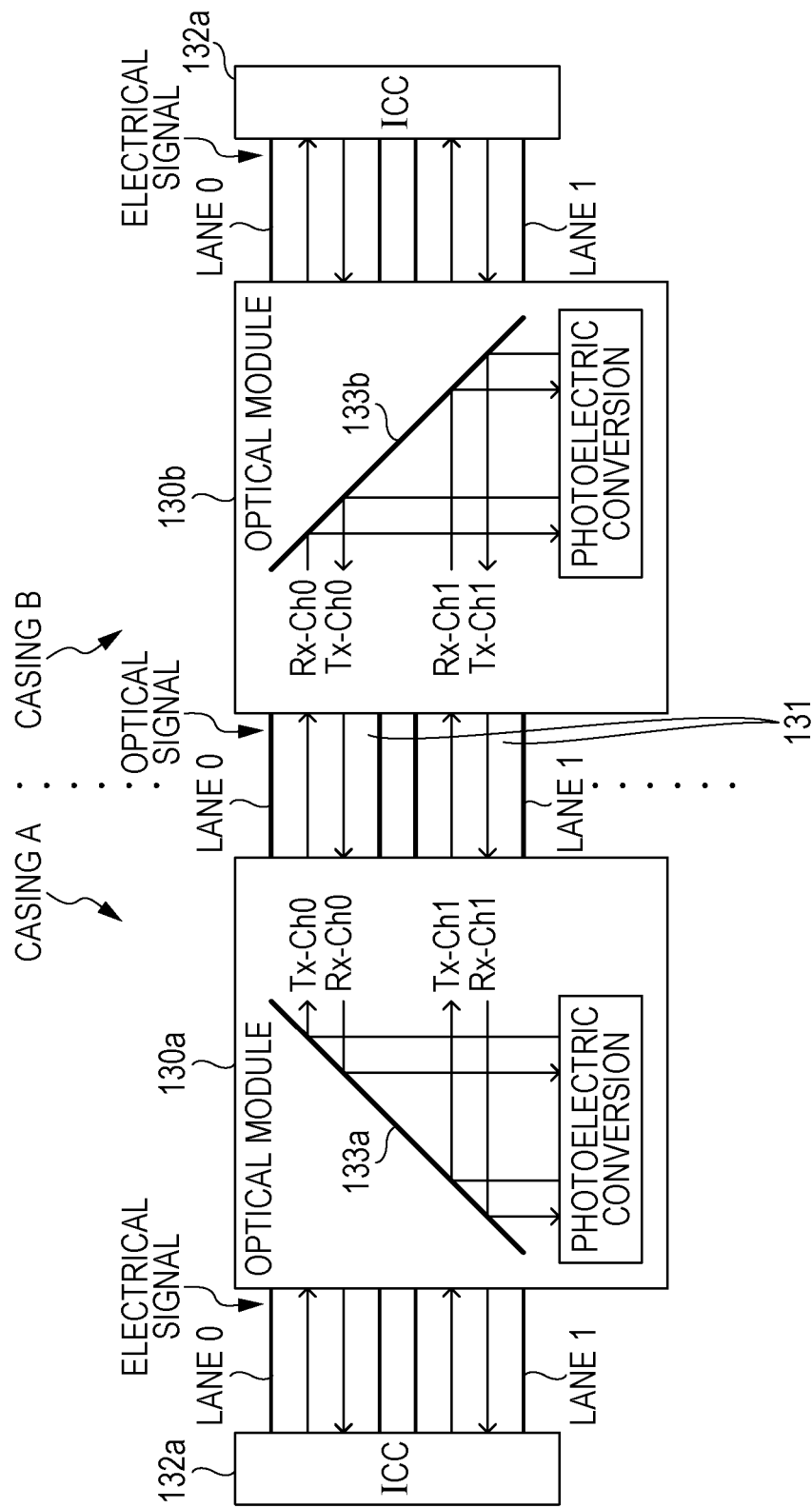
FIG. 13 is a diagram illustrating an example of connection of optical modules mounted in each casing.

In recent years, use of optical communications via optical modules for interconnect communications is becoming the mainstream. An optical module is a device that converts an electrical signal into an optical signal, and an optical signal into an electrical signal. As illustrated in FIG. 13, optical modules 130 (130a and 130b) in casing A and casing B are coupled via a fiber cable 131 (for example, an interconnect cable). The fiber cable 131 includes a plurality of lanes. A lane consists of a pair of a transmission path in the transmission direction (Tx) and a transmission path in the reception direction (Rx). In FIG. 13, a lane 0 and a lane 1 are illustrated. Also, a configuration including a plurality of lanes (for example, the lane 0 and the lane 1) is referred to as a link, and such a configuration is also referred to as a multi-lane system.

Also, the optical module 130 is provided with a plurality of channels (Ch) that perform reception (Rx) and transmission (Rx). In FIG. 13, Ch0 is used as a lane 0, and Ch1 is used as a lane 1. Specifically, the transmission channel (Tx-Ch0) and the reception channel (Rx-Ch0) uses the lane 0, and the transmission channel (Tx-Ch1) and the reception channel (Rx-Ch1) uses the lane 1.

Also, it is assumed that the optical module 130 is a board mounted type, and thus a vertical cavity surface emitting laser (VCSEL) is used. Accordingly, an optical signal is emitted from a photoelectric conversion circuit in the vertical direction and is reflected by a mirror 133 (133a and 133b) so that the direction of the optical signal is changed. Thereby, the optical signal is transmitted to the optical module of an adjacent node via a fiber cable 131.

Also, the optical module 130 is coupled to an ICC 132 (132a and 132b) via a cable, and information is transferred with the ICC 132 by transmission and reception of electrical signals via the cable. In this regard, the above-described node includes a CPU and a memory that are not illustrated in FIG. 13, the optical module 130, and the ICC 132. Specifically, one node includes a CPU and a memory that are not illustrated in FIG. 13, the optical module 130a, and the ICC 132a.

Here, a description will be given of an immediate power disconnection. In a node (computer), a function called an immediate power disconnection is implemented. An immediate power disconnection is disconnecting all the power sources in a casing by ignoring a power-off sequence at normal time in order to avoid hardware destruction, a fire, or the like if abnormalities that might cause these incidents are detected. The cases where an immediate power disconnection is carried out include, for example, a case where an abnormal voltage of the power source is detected, a case where an abnormally high temperature is detected in a device in a casing, a case where water leakage or condensation is detected, and the like.

When an immediate power disconnection is carried out in a certain casing, the ICCs of the nodes coupled to the casing detect a hardware failure by an abrupt interception of communications. The ICCs that have detected the interception of communications disable the coupled links, that is to say, make the links unable to use in order to minimize the impact on the supercomputer system (hereinafter also referred to simply as a system). At this time, light emission of the optical module is stopped at the same time. Subsequently to the disabling, it is not possible to use the disabled links.

Figure 14:
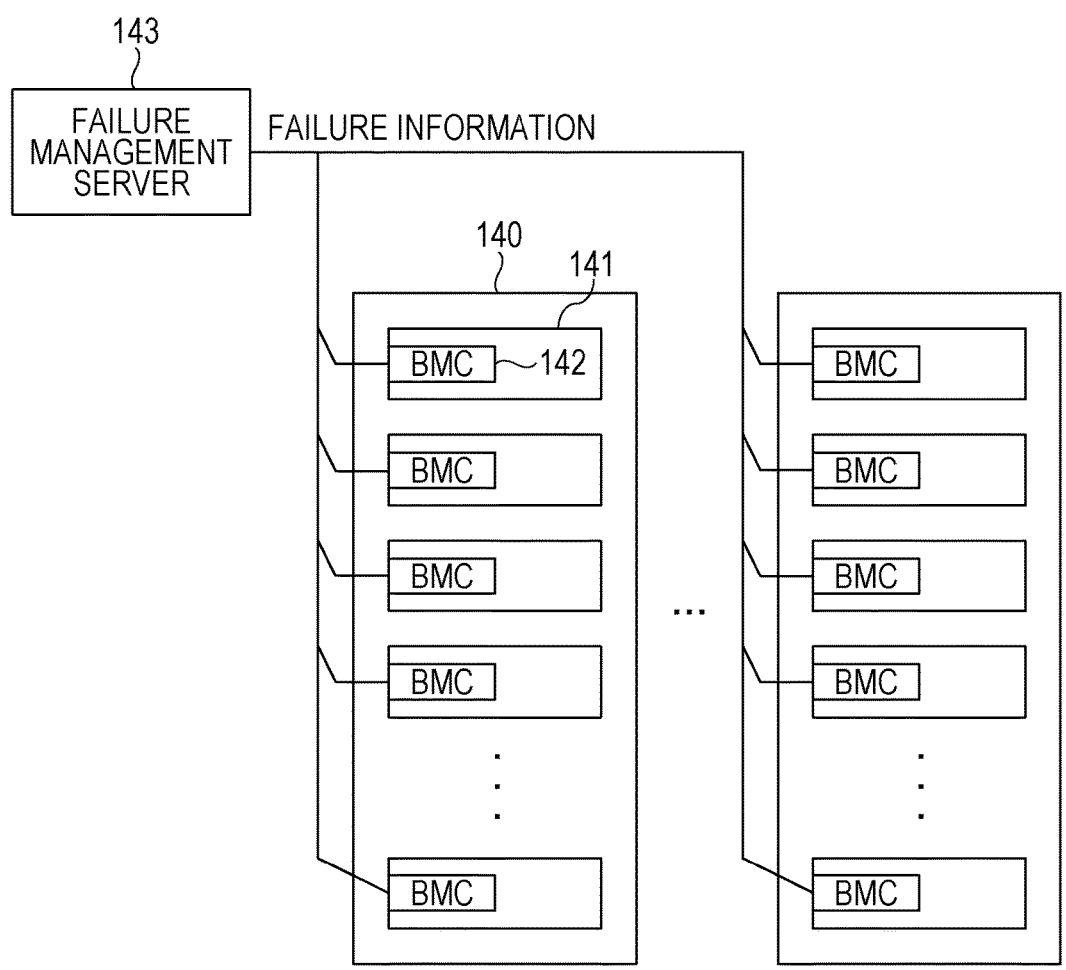
FIG. 14 is a diagram illustrating an example of connection between the BMCs mounted in casings and a failure management server.

A description will be given of collection of failure information when a hardware failure has occurred. As illustrated in FIG. 14, a controller (also referred to as a service processor) called a baseboard management controller (BMC) 142 is mounted in a casing 141 mounted in a rack 140, and the BMC 142 of each casing 141 is coupled to a failure management server (hereinafter also referred to as a failure management device) 143 that manages failure information. In this regard, one BMC 142 manages one casing 141 in this example, but one BMC may manage a plurality of casings. Firmware (hereinafter referred to as BMC firm) that operates on a device (BMC) performs hardware control in the casing 141 and records events (the logs of the occurrence of error and power source operations, or the like).

If a failure occurs in a device (for example, an ICC, a CPU, a memory, or the like) in the casing 141, the device that has detected the failure notifies the BMC 142 of the occurrence of the failure. If the BMC firm detects a failure, the BMC firm collects hardware information (a value of an error status register, temperature information, voltage and current value information, and the like) of the failed device. The BMC firm transmits the collected information to the failure management server 143 that manages the failure information of the entire system. The failure management server 143 stores the transmitted failure information in a database not illustrated in FIG. 14. The database is used for a failure analysis, a determination of exchanging parts, and the like. In this regard, a network used for transferring failure information is referred to as a failure management network.

Figure 15:
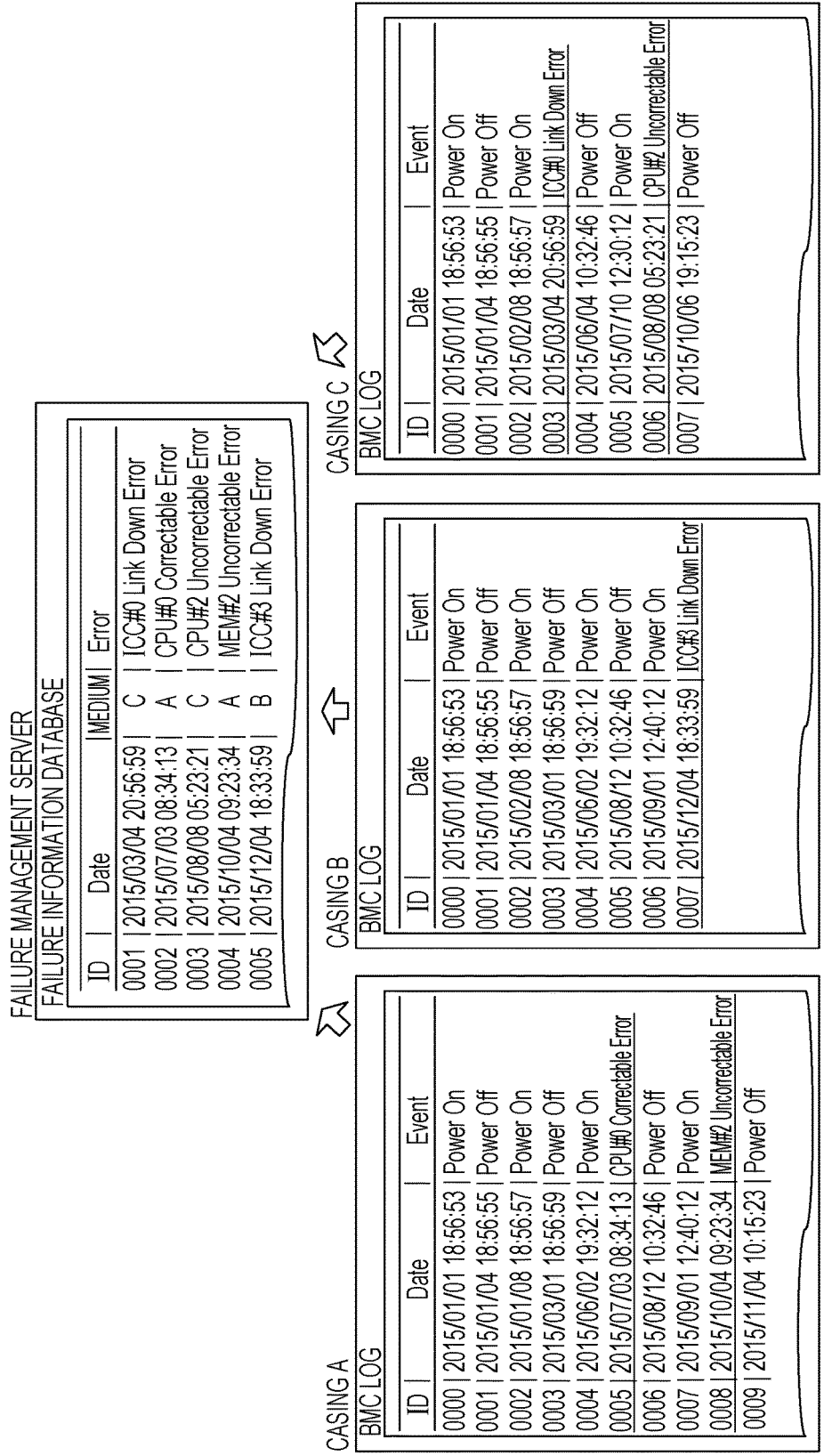
FIG. 15 is a diagram illustrating an example of a BMC log in each casing and the failure information database.

An example of the logs (BMC logs) recorded by the BMC firm in each casing and information in the failure information database held by the failure management server is illustrated in FIG. 15. The BMC log of each casing contains log information (information that is underlined) of failures that occurred in the casing, and log information (information that is not underlined) of normal events, such as power on, power off, or the like.

The information of the failures that occurred in the casing is, for example, the log information of the IDs of 0005 and 0008 in the case of the BMC log of the casing A. The log having the ID of 0005 indicates that a correctable error occurred in the CPU#0 in the casing A. A log of the occurrence of a failure is transmitted to the failure management server by the BMC firm of each casing and is added to the failure information database.

The failure information database stores the failure information transmitted from the BMC firm of each casing. In the example in FIG. 15, the failure information is stored in ascending order of failure occurrence time (date), the casing in which a failure occurred is obtained from the description field of "medium", and the failure contents is obtained from the description field of "Error".

If an immediate power disconnection occurs in a casing in a system, the ICCs of the nodes in a large number of casings that are coupled to that casing via interconnects detect the failure. As a result, the BMC firms transmit a large amount of failure information to the failure management server, and thus the network and the failure management server go into a high load state because of transmission and processing of the large amount of failure information.

On the other hand, the size of a system tends to increase year by year, and thus the amount of failure information that is transmitted to a failure management server and processed by the failure management server is increasing as a result. Accordingly, in order to maintain the scalability of a system, it is thought that the importance of reduction in loads of a network and a failure management server increases in the future. Thus, it is particularly important to increase the efficiency in the failure information processing against an immediate power disconnection, which is responsible for causing a high load state.

In the following, a description will be given of an embodiment that makes it possible to increase the efficiency of the failure information processing against an immediate power disconnection.

At a point in time when BMC firm transmits failure information to a failure management server, a determination is made as to whether or not the failure is not due to a failure of an ICC, but due to an immediate power disconnection. If the failure is due to an immediate power disconnection, transmission of failure information, which is caused by an immediate power disconnection and is dispensable, is suppressed. In order to do that, at a point in time when an ICC detects a failure, the power source state (whether the power source is on or off) of the casing of the coupling destination has to be confirmed. However, at the time of the occurrence of an immediate power disconnection, the power is not supplied to the ICC and the optical module, and thus the operation is not possible. Accordingly, communications using interconnects are not possible, and it is difficult to simply obtain the power source state of the casing of the coupling destination.

Thus, in the information processing apparatus according to the embodiment, the following configuration is employed in order to obtain the power source state of the casing of the coupling destination. In a power-off state, an optical module structure is employed that makes it possible to return an optical signal from the Ch0 (first channel) to the Ch1 (second channel), and at the time of the occurrence of an immediate power disconnection, an optical signal received by an optical module in that casing is sent back from the Ch0 to the Ch1. Further, a mechanism (optical module control section) that gives a transmission instruction of an optical signal and performs reception confirmation after disabling a link is added. Further, a mechanism (whether-to-transmit failure information determination section) that distinguishes a secondary failure detection due to an immediate power disconnection and a normal ICC failure is added by a combination of reception states of an optical signal by Ch0 and Ch1. A detailed description will be given later.

With such a configuration, it becomes possible to determine the power source state of the casing of the coupling destination in a closed range of the failure-detected casing, and thus it is possible to determine whether or not transmission of the failure information is possible.

Figure 1:
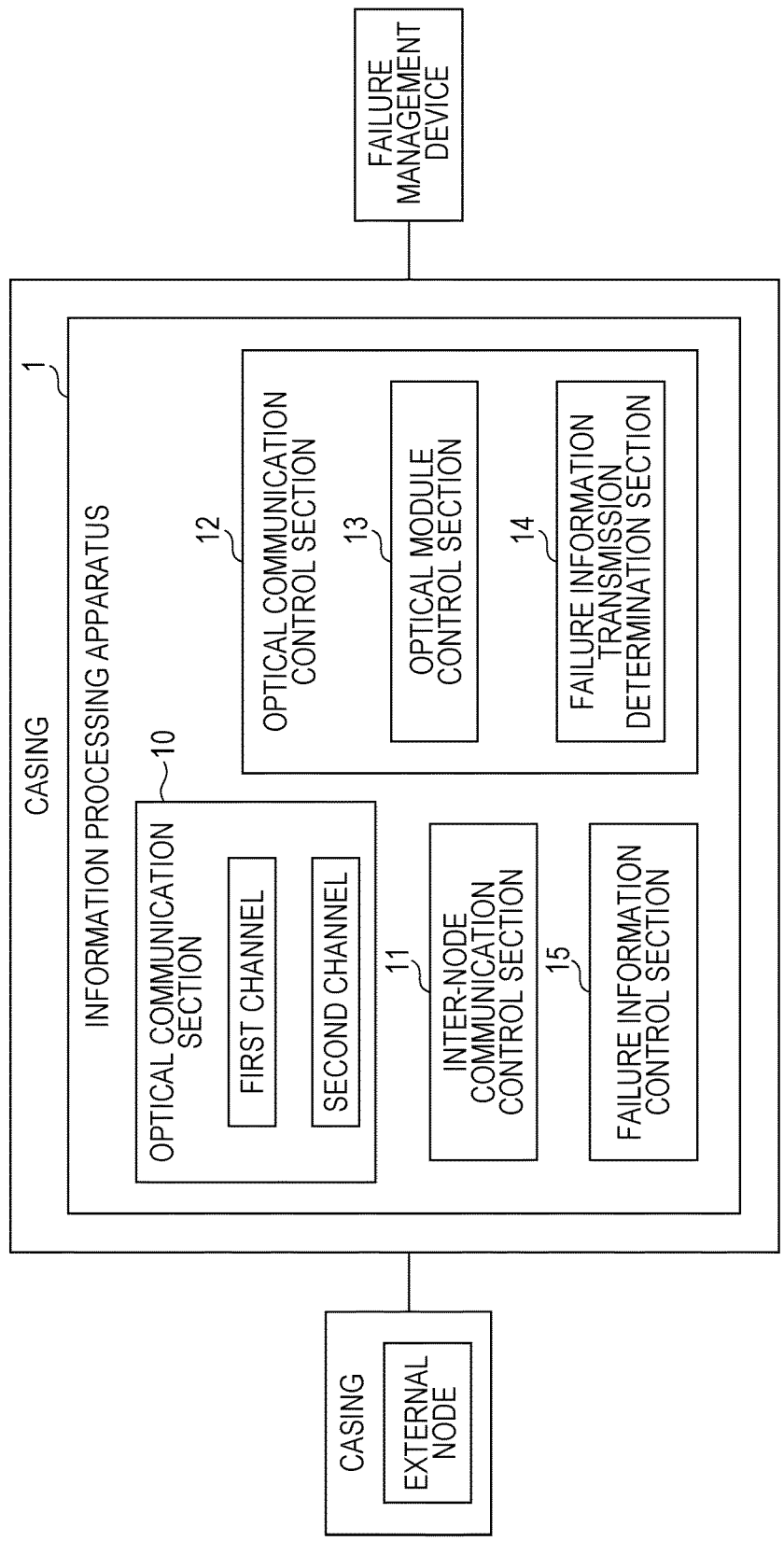
FIG. 1 is a functional block diagram of an information processing apparatus according to an embodiment.
Figure 2:
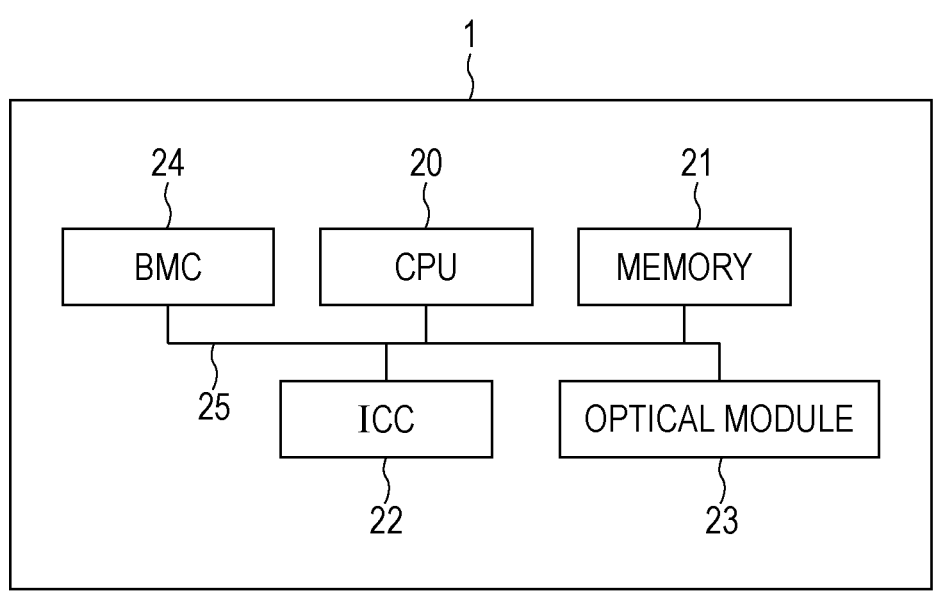
FIG. 2 is a diagram illustrating an example of the hardware configuration for realizing the information processing apparatus according to the embodiment.

FIG. 1 is a functional block diagram of an information processing apparatus 1 according to the embodiment. FIG. 2 is a diagram illustrating the hardware configuration for performing processing by each functional block of the information processing apparatus 1 according to the embodiment. The hardware configuration of the information processing apparatus 1 includes, for example, a processor 20, a memory 21, an ICC 22, an optical module 23, a BMC 24, and a bus 25. The processor 20, the memory 21, the ICC 22, the optical module 23, and the baseboard management controller (BMC) 24 are mutually coupled via the bus 25.

As illustrated in FIG. 1, the information processing apparatus 1 includes an optical communication section 10, an inter-node communication control section 11, an optical communication control section 12, an optical module control section 13, a whether-to-transmit failure information determination section 14, and a failure information control section 15. In this regard, the configuration of the information processing apparatus 1 is not limited to the configuration described above, and the other configuration may be included.

The optical communication section 10 converts an electrical signal into an optical signal and transmits the converted optical signal to the optical module of the node mounted in the adjacent casing via an interconnect cable. Also, the optical communication section 10 receives an optical signal transmitted from the optical module of a node mounted in the adjacent casing via an interconnect cable, and converts the received optical signal into an electrical signal.

Also, the optical communication section 10 causes the light emission element on a predetermined transmission channel (for example, the transmission channel Tx-Ch0 of the lane 0) to emit light based on a light emission instruction from the optical module control section 13. Also, if the optical communication section 10 receives an optical signal from the optical module of the node mounted in the adjacent casing by the first channel (for example, Ch0 of the lane 0) at the time of an immediate power disconnection of the own casing, the optical communication section 10 sends back (returns) the optical signal to the second channel (for example, Ch1 of the lane 1). The above-described processing by the optical communication section 10 is processing performed by the optical module 23. The optical communication section 10 may be configured by one optical transceiver, or two or more optical transceivers.

The inter-node communication control section 11 detects that a failure has occurred in the communication with the node (the coupling destination node and is also referred to as an external node) mounted in the adjacent casing. At this time, the inter-node communication control section 11 does not know whether the detected failure is due to an immediate power disconnection or due to a failure of the ICC of the coupling destination node, or the like at this point in time.

If the inter-node communication control section 11 detects the occurrence of a failure, the inter-node communication control section 11 notifies the BMC of the occurrence of a failure. Also, in order to minimize the impact on the system, the inter-node communication control section 11 disables the link with the coupling destination node in which the failure has occurred. The inter-node communication control section 11 transmits a notification (link disabling completion notification) of the occurrence of a failure to the optical module control section 13. At this time, the inter-node communication control section 11 also stops light emission of the optical module. By disabling the link, the link is not used until the disabling is removed. The above-described processing by the inter-node communication control section 11 is the processing performed by the ICC 22.

The optical communication control section 12 includes an optical module control section 13 and a whether-to-transmit failure information determination section 14.

When the optical module control section 13 receives a link disabling completion notification by the inter-node communication control section 11, the optical module control section 13 gives a light emission instruction to the optical communication section 10 so that the light emission element of the channel (for example, the transmission channel Tx-Ch0 of the lane 0) of the optical module emits light. Also, after the optical module control section 13 issued the light emission instruction, the optical module control section 13 obtains the light reception level of the channel (for example, the reception channel Rx-Ch0 of the lane 0 and the reception channel Rx-Ch1 of the lane 1) of the optical module.

The whether-to-transmit failure information determination section 14 determines whether or not the power source of the coupling destination node is off based on the obtained light reception level. The processing performed by the optical module control section 13 and the whether-to-transmit failure information determination section 14 is the processing performed by the processor 20 described above.

If the power source of the coupling destination node is off, the failure information control section 15 selects a failure notification, that is to say, selects failure information excluding failure information caused by an immediate power disconnection. The processing performed by the failure information control section 15 is the processing performed by the BMC 24 described above.

Here, a description will be given of an example of the structure of the optical module 23 with reference to FIG. 3. Here, a description will be given by taking the optical module 23 of the node mounted in the casing B as an example. However, the optical module of the node mounted in other casing (for example, the casing A) has the same structure.

As the structure of the optical module 23, a potassium tantalate niobate (KTN) crystal 30 is used in order to realize a loopback (returning of an optical signal to the optical module 23 itself) of an optical signal in the off state of the power source. A KTN crystal 30 is an optical crystal made from potassium (K), tantalum (Ta), and niobium (Nb), and is a material having a large amount of change in the refractive index with respect to an applied voltage. It is possible to control total reflection and transmission by an applied voltage. In this regard, the material is not limited to a KTN crystal as long as the material is capable of being used for controlling total reflection and transmission by an applied voltage. Also, the material may be a material having a refractive index that is changed by an applied current.

Figure 3:
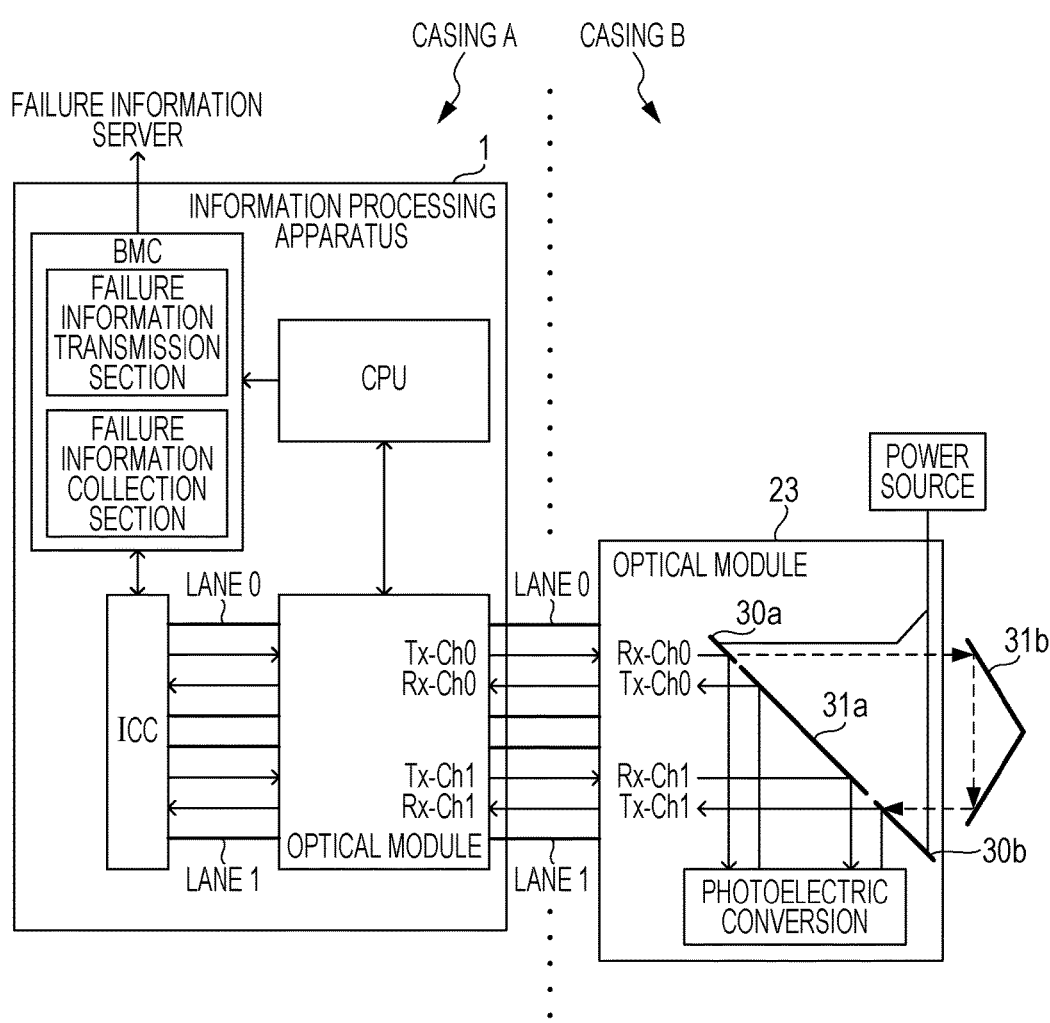
FIG. 3 is an explanatory diagram of the structure of an optical module.

As illustrated in FIG. 3, the KTN crystal 30 (30a and 30b) and a mirror 31 (31a and 31b) are disposed in the optical module 23 of the casing B side. With such an arrangement, if the power source of the casing B is off (no applied voltage), the refractive index of the KTN crystal 30a is low. Accordingly, an optical signal from the optical module of the casing A goes straight without being reflected by the boundary face of the KTN crystal 30a (dashed arrows). At this time, an optical signal that is incident from the Rx-Ch0 is reflected by the mirror 31b and goes to the Tx-Ch1. At this time, since the power source of the casing B is in the off state, the optical signal goes straight without being reflected by the boundary face of the KTN crystal 30b.

In this regard, at a normal loopback, an optical signal is returned from a Tx to a Rx having the same channel number (for example, returning from Tx-Ch0 to Rx-Ch0), but an optical signal is incident on a channel having a different number here. A description will be given later of the reason for doing in this manner, that is to say, the reason for not simply returning an optical signal to the channel having the same number. On the other hand, at the time of normal operation (the on state of the power source), a voltage is applied to the KTN crystal 30, and an optical signal is subjected to total reflection by the boundary face of the KTN crystal 30a. At this time, an optical signal passes through the same path (a path to proceed from the KTN crystal 30a to a circuit that performs photoelectric conversion) as in the case of the related-art optical module.

In this manner, an optical signal is transmitted between the optical modules mounted in respective adjacent casings, and the power source state of the adjacent casing is confirmed. Accordingly, it is not possible to directly obtain the power source state of the casing that is not adjacent to each other.

Figure 4:
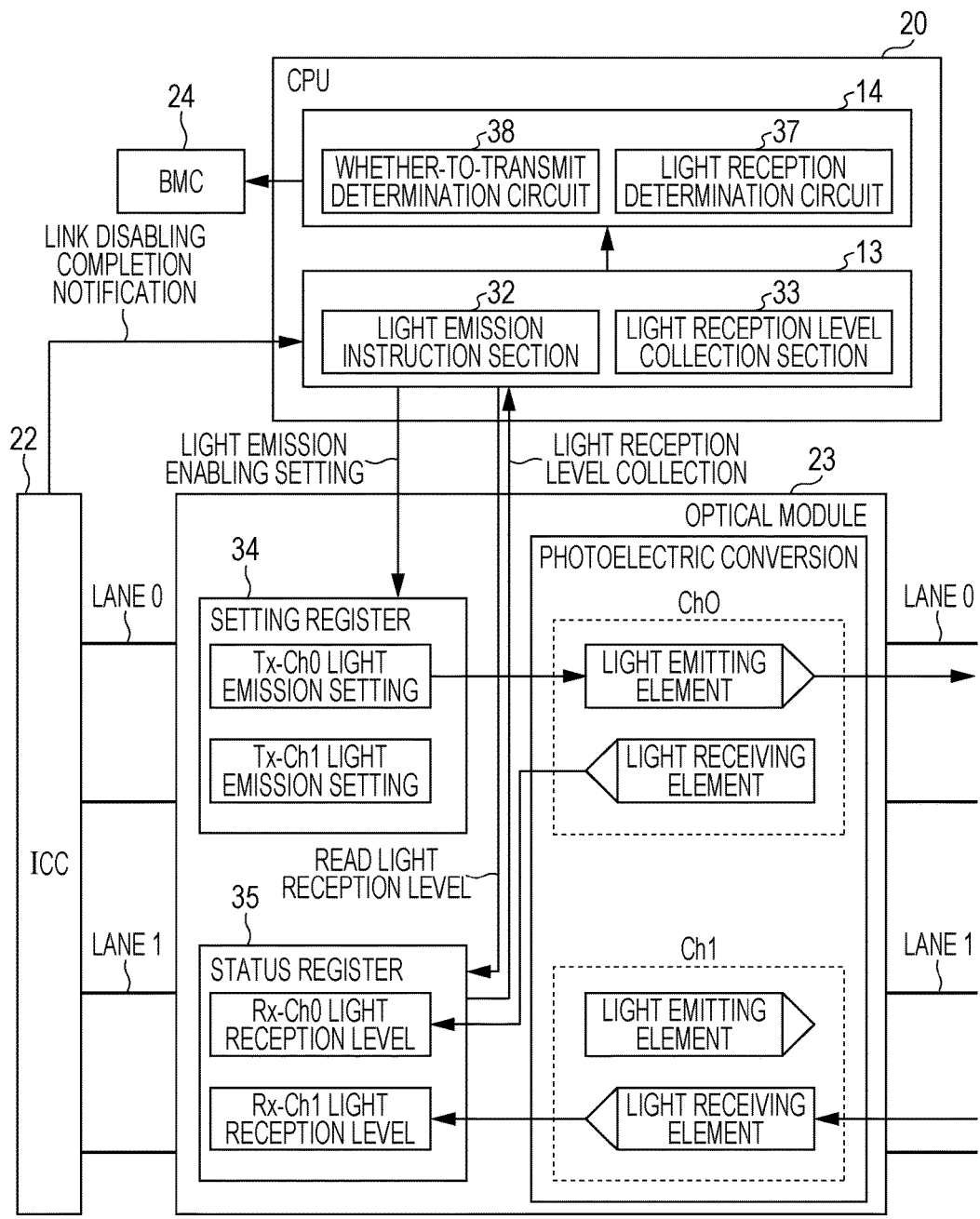
FIG. 4 is an explanatory diagram of the processing of an optical module control section and a whether-to-transmit failure information determination section.

In the following, a description will be given of the processing in the optical module control section 13 and the whether-to-transmit failure information determination section 14 with reference to FIG. 4.

When the ICC 22 completes disabling of the link, the ICC 22 notifies the optical module control section 13 of a link disabling completion. The light emission instruction section 32 in the optical module control section 13 that has received the link disabling completion notification causes only the light emission element of the transmission channel (for example, Tx-Ch0) of the optical module 23 to compulsorily emit light. This is carried out by setting light emission enabling of the light emission element of Tx-Ch0 in the Tx-Ch0 light emission setting of the setting register 34 in the optical module 23. The setting register 34 is used for setting whether or not to cause the light emission element of the channel to emit light for each transmission channel.

If the power to the casing of the adjacent coupling destination is off, an optical signal sent from the Tx-Ch0 (the light emission element of the channel 0) of the optical module 23 is transmitted through the KTN crystal by the above-described loopback, and is returned to Ch1 of the optical of the casing of the coupling destination. The returned optical signal then ought to reach Rx-Ch1 (the light receiving element of the channel 1) of the optical module 23, and it becomes possible to confirm the power source state of the casing of the coupling destination by the presence or absence of reception of the optical signal by the light receiving element of the channel 1. That is to say, if the optical signal is received by the light receiving element of the channel 1, it is understood that the power to the casing of the coupling destination is off.

When the light emission instruction of the light emission element of Tx-Ch0 is completed, the light emission instruction section 32 notifies the light reception level collection section 33 of the light emission instruction completion. The light reception level collection section 33 that has received the light emission instruction completion notification collects the light reception levels of the optical signals by the light receiving elements of Rx-Ch0 and Rx-Ch1 after a lapse of a certain time period from the light emission instruction completion notification. This collection is carried out by reading the Rx-Ch0 light reception level and the Rx-Ch1 light reception level of the status register 35 in the optical module 23. The status register 35 stores the light reception level received by the light receiving element for each reception channel.

Here, a description will be given of the reason why the optical signal is not returned to the channel having the same number. The reason why the channel numbers are distinguished between the transmission channel and the reception channel is in order to correctly determine the power source state even if the ICC detects a failure not due to an immediate power disconnection but due to a normal hardware failure.

Consider the case of using only Ch0 (an optical signal is simply returned from Tx-Ch0 to Rx-Ch0, and the optical module control section 13 confirms the light reception level of the optical signal of Rx-Ch0). In this case, when a normal ICC failure rather than an immediate power disconnection occurs, the ICCs of both of the casings (the casing A and the casing B) cause the light emission element of Tx-Ch0 to emit light, but not because of an immediate power disconnection. Thereby, although loopback is not carried out, for example, the optical signal from the optical module of the casing A reaches Rx-Ch0 of the optical module of the casing B. In the same manner for the casing A, the optical signal from the optical module of the casing B reaches Rx-Ch0 of the optical module of the casing A.

Figure 5:
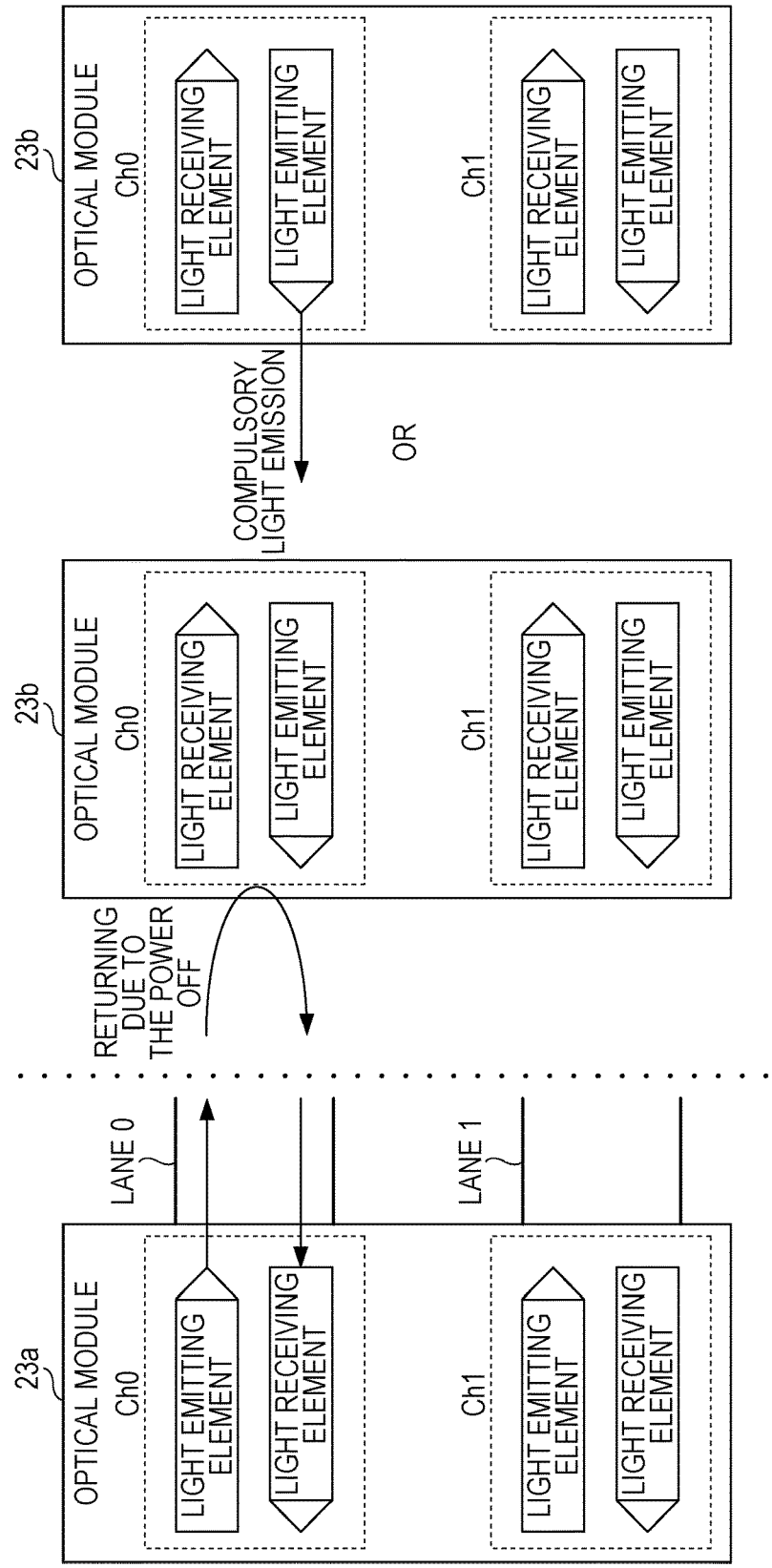
FIG. 5 is an explanatory diagram of the reason why an optical signal to a channel having the same number is not returned.

When the optical signal reaches Rx-Ch0, as illustrated in FIG. 5, it is thought that there are two cases. One of the cases is that the optical signal is returned due to the power off. The other of the cases is that the ICC causes the optical module to compulsorily emit light. Accordingly, it is not possible to determine the power source state of the casing of the coupling destination by the presence or absence of reception of the optical signal.

That is to say, in the case where the power source of the casing in which the optical module 23b of the coupling destination is mounted is in the off state, an optical signal from the light emission element of the channel 0 (Ch0) of the optical module 23a is returned and is received by the light receiving element of the channel 0. Also, although the power source of the casing in which the optical module 23b of the coupling destination is mounted is in the on state, when the ICC causes the light emission element of the optical module 23b to compulsorily emit light due to a hardware failure, the light receiving element of the channel 0 of the optical module 23a receives the optical signal. In this case, it is not possible to determine the power source state of the casing of the coupling destination by whether or not the optical signal is received.

Figure 6:
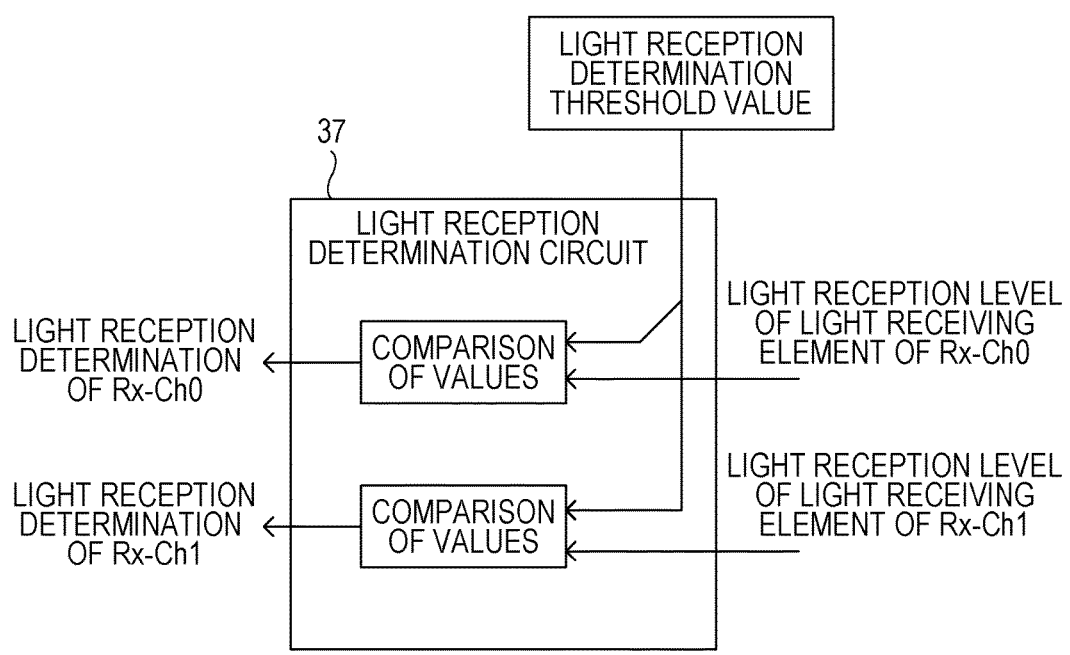
FIG. 6 is an explanatory diagram of comparison processing in magnitude of light reception levels by a light reception determination circuit.

Returning to the description of the processing of the whether-to-transmit failure information determination section 14. The whether-to-transmit failure information determination section 14 determines whether or not to transmit failure information to the BMC 24. The information on the light reception level of the light receiving element of Rx-Ch0 and the light reception level of the light receiving element of Rx-Ch1, which were collected by the light reception level collection section 33, is sent to the light reception determination circuit 37 of the whether-to-transmit failure information determination section 14. The light reception determination circuit 37 compares the received light reception level with a light reception determination threshold value provided in advance and determines whether or not the optical signal reaches. Specifically, as illustrated in FIG. 6, the light reception determination circuit 37 compares the light reception level of the light receiving element of Rx-Ch0 with a corresponding light reception determination threshold value, and for example, if the light reception level of the light receiving element of Rx-Ch0 is higher than the light reception determination threshold value, the light reception determination circuit 37 determines that Rx-Ch0 receives light. Whether or not light is received by Rx-Ch1 is determined in the same manner.

When the determination of whether or not light is received is completed, the determination contents of whether or not light is received by Rx-Ch0 and Rx-Ch1 is sent to whether-to-transmit determination circuit 38, and whether to transmit failure information described below is determined by the whether-to-transmit determination circuit 38.

In this regard, basically it is possible to determine the power source state of the casing of the coupling destination only by whether or not light is received by Rx-Ch1. However, the reason why the light reception level of Rx-Ch0 is taken into consideration as described above is that if the optical signal incorrectly reaches Rx-Ch1 due to a hardware failure, a determination might be mistakenly made that the failure information does not have to be transmitted (the power source of the casing of the coupling destination is off). Accordingly, failing to transmit the failure information that has to be transmitted is avoided.

A description will be given of the case where a determination is mistakenly made by determining only by light reception by Rx-Ch1 with reference to FIG. 7. As a case of making a mistaken determination, there is a case where the processing for stopping light emission to the optical module at link disabling time fails, and thus light emission continues. The processing for stopping light emission to the optical module is carried out by setting the setting register in the optical module by Inter-Integrated Circuit (I2C). However, the case occurs where an I2C access fails due to a failure of an optical module, and thereby stopping light emission fails.

Figure 7:
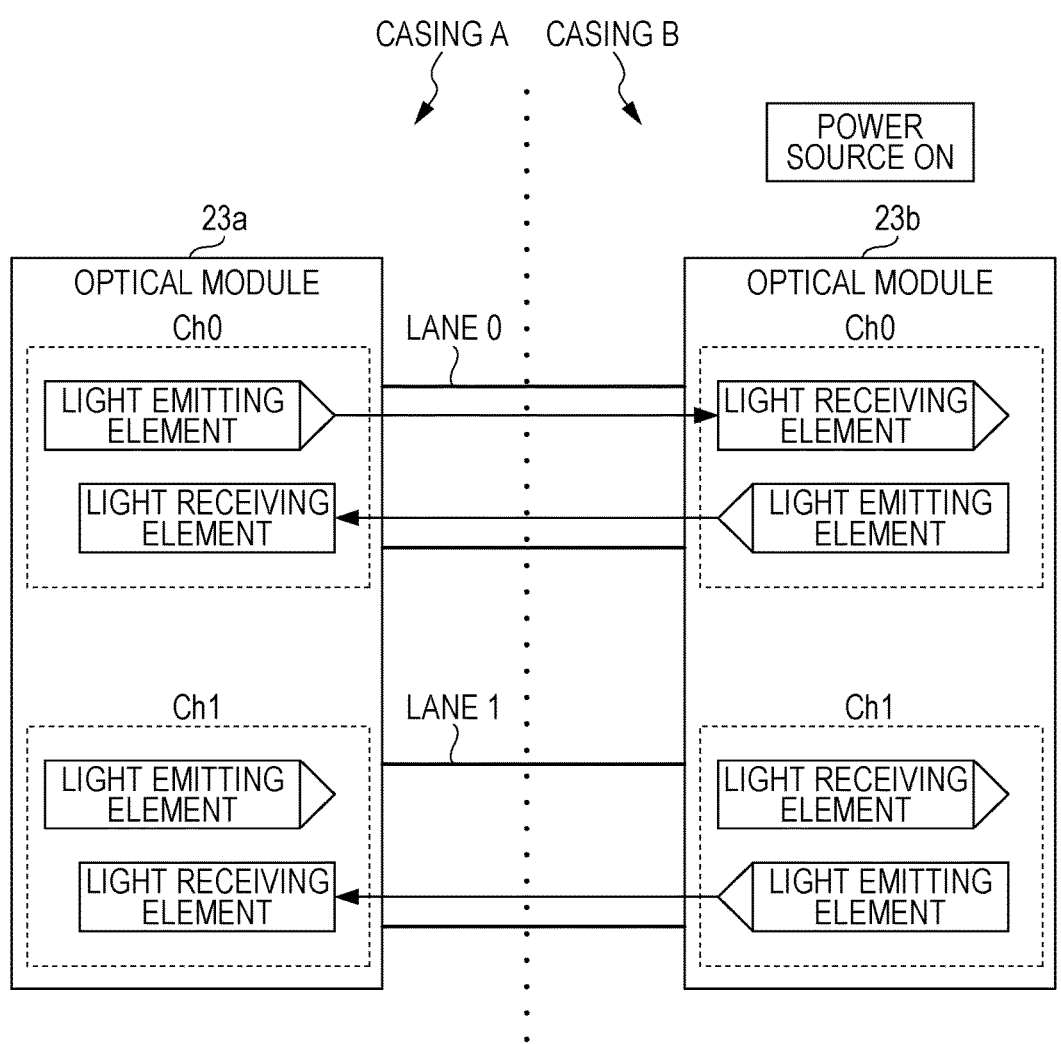
FIG. 7 is an explanatory diagram of the case where an erroneous determination is made if determined only the presence or absence of received light by Rx-Ch1.

FIG. 7 illustrates the case where an I2C access fails in the optical module 23b of the casing B side. In this case, the light emission elements of Ch0 and Ch1 of the optical module 23b of the casing B side continues emitting light to the optical module 23a. Accordingly, the optical signal reaches the light receiving element of Ch1 of the optical module 23a of the casing A, and thus the power source state of the casing B is determined to be off. However, the power source of the casing B is actually in the on state, and thus this determination is mistaken.

Figure 8:
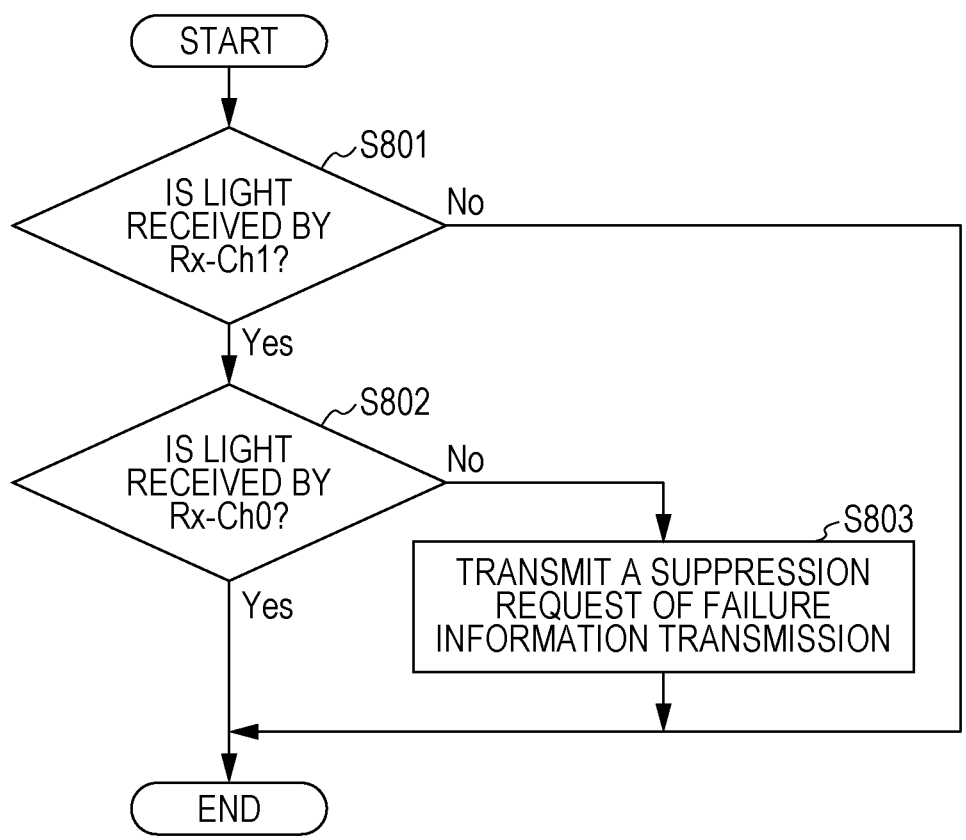
FIG. 8 is a flowchart illustrating the determination processing in consideration of the presence or absence of received light by the light receiving elements of both Rx-Ch0 and Rx-Ch1.

In order to avoid such erroneous determination, here a determination is made in consideration of whether or not light receiving elements of both of the Rx-Ch0 and Rx-Ch1 receive light. An example of the determination processing flow in this case is illustrated in FIG. 8. The determination processing is performed by the whether-to-transmit determination circuit 38 of the whether-to-transmit failure information determination section 14.

First, the whether-to-transmit determination circuit 38 determines whether or not the light receiving element of Rx-Ch1 receives light (step S801). If the light receiving element of Rx-Ch1 does not receive light (No in step S801), that is to say, light is disconnected by Rx-Ch1 (not receiving light), the case corresponds to case 1 or case 3 illustrated in the following. The whether-to-transmit determination circuit 38 determines that the failure information has to be transmitted and terminates the whether-to-transmit determination processing.

On the other hand, if the light receiving element of Rx-Ch1 receives light (Yes in step S801), the whether-to-transmit determination circuit 38 determines whether or not the light receiving element of Rx-Ch0 receives light (step S802).

If the light receiving element of Rx-Ch0 does not receive light (No in step S802), that is to say, if light is disconnected by Rx-Ch0, this case corresponds to the case 2 as described in the following. The whether-to-transmit determination circuit 38 determines that the failure information does not have to be transmitted and transmits the failure information transmission suppression request to the BMC 24.

On the other hand, if the light receiving element of Rx-Ch0 receives light (Yes in step S802), that is to say, light is connected by Rx-Ch0 (receiving light), this case corresponds to the case 4 illustrated in the following. The whether-to-transmit determination circuit 38 determines that the failure information has to be transmitted and terminates the whether-to-transmit determination processing.

The case 1 is the case where light is connected by the light receiving element of Rx-Ch0, whereas light is disconnected by the light receiving element of Rx-Ch1. In the case 1, the optical signal reaches the light receiving element of Rx-Ch0, thus the optical signal is not transmitted through the KTN crystal 30a, and the power source of the casing of the coupling destination is on. Also, the optical signal does not reach the light receiving element of Rx-Ch1, thus the optical signal is not transmitted through the KTN crystal 30a, and the power source of the casing of the coupling destination is on. Accordingly, the power source of the casing of the coupling destination is on, and it is determined that the failure information has to be transmitted to the failure management server.

The case 2 is the case where light is disconnected by the light receiving element of Rx-Ch0, whereas light is connected by the light receiving element of Rx-Ch1. In the case 2, the optical signal does not reach the light receiving element of Rx-Ch0, thus the optical signal is transmitted through the KTN crystal 30a, and the power source of the casing of the coupling destination is off. Also, the optical signal reaches the light receiving element of Rx-Ch1, thus the optical signal is transmitted through the KTN crystal 30a, and the power source of the casing of the coupling destination is off. Accordingly, the power source of the casing of the coupling destination is off, and it is determined that the failure information has not to be transmitted to the failure management server.

The case 3 is the case where light is disconnected by the light receiving element of Rx-Ch0, and light is disconnected by the light receiving element of Rx-Ch1. In the case 3, the optical signal does not reach the light receiving element of Rx-Ch0, thus the optical signal is transmitted through the KTN crystal 30a, and the power source of the casing of the coupling destination is off. Also, the optical signal does not reach the light receiving element of Rx-Ch1, thus the optical signal is not transmitted through the KTN crystal 30a, and the power source of the casing of the coupling destination is on. An inconsistent power source state occurs, and thus it is thought that abnormality of hardware has occurred. Accordingly, it is determined that the failure information has to be transmitted to the failure management server.

The case 4 is the case where light is connected by the light receiving element of Rx-Ch0, and light is connected by the light receiving element of Rx-Ch1. In the case 4, the optical signal reaches the light receiving element of Rx-Ch0, thus the optical signal is not transmitted through the KTN crystal 30a, and the power source of the casing of the coupling destination is on. Also, the optical signal reaches the light receiving element of Rx-Ch1, thus the optical signal is transmitted through the KTN crystal 30a, and the power source of the casing of the coupling destination is off. An inconsistent power source state occurs, and thus it is thought that abnormality of hardware has occurred. Accordingly, it is determined that the failure information has to be transmitted to the failure management server.

As described above, if it is determined that failure information does not have to be transmitted, the whether-to-transmit determination circuit 38 transmits a failure information transmission suppression request to the BMC 24 (the failure information transmission section). This is carried out by assertion (enabling), by the whether-to-transmit determination circuit 38, of the transmission suppression signal of the failure information transmitted to the BMC 24. The BMC (the failure information transmission section of the BMC firm) that has received this assertion stops transmission of the failure information.

Figure 9:
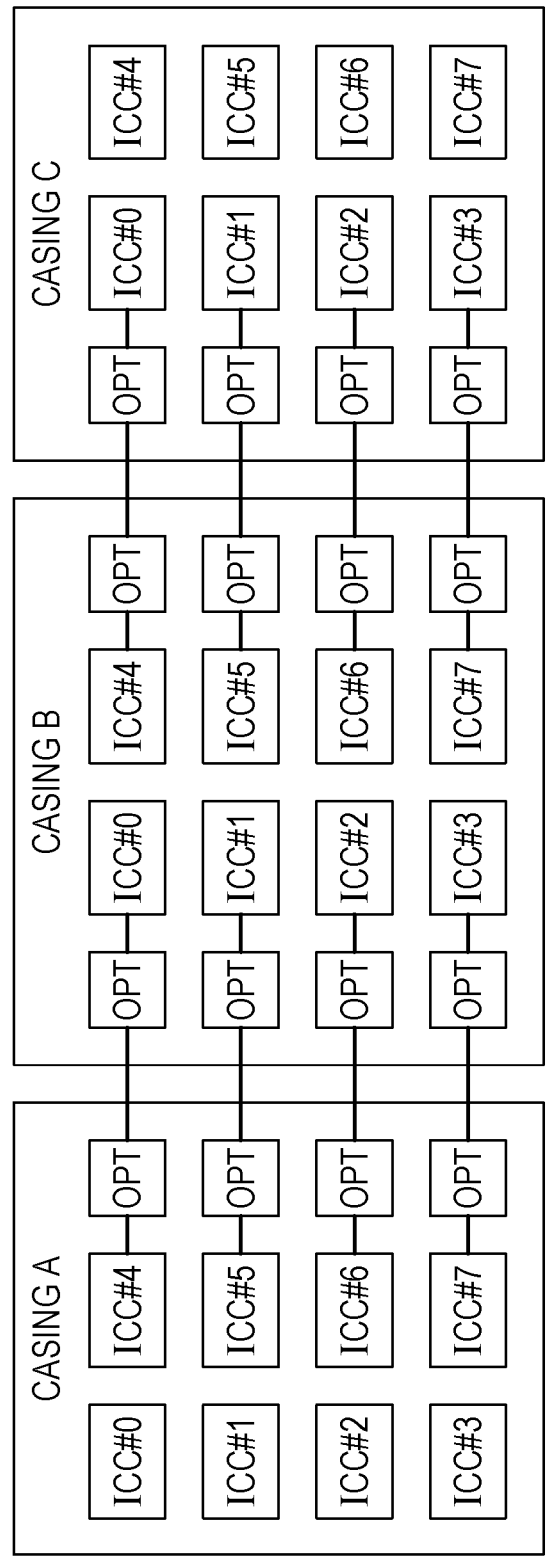
FIG. 9 is a diagram illustrating an example of connection of ICCs in the nodes mounted on a casing A, a casing B, and a casing C with one another.

Here, a description will be given of the failure information to be suppressed for transmission with reference to FIG. 9 and FIG. 10. FIG. 9 illustrates an example of connection of ICCs with one another in the not illustrated nodes mounted in the casing A, the casing B, and the casing C. In this example, an ICC of the node mounted in a casing is connected to an ICC of the node mounted in an adjacent casing via an OPT. OPT denotes an optical module. In this regard, an example of the connection is not limited to this. For example, one optical module may be shared by a plurality of nodes. In this case, a lane has to be separated for each node (ICC).

In this connection relationship, it is assumed that an abnormal voltage is detected at the power source of the casing B, and an immediate power disconnection occurs. Thereby, the logs indicating these, that is to say, the log of the event of a voltage error (abnormal voltage) and the log of the event of a force power off (immediate power disconnection) are recorded in the BMC log (the respective IDs are 000a and 000b) of the casing B (refer to FIG. 10).

By the immediate power disconnection of the casing B, ICC#4 to ICC#7 of the casing A connected to the casing B, and ICC#0 to ICC#3 of the casing C detect a communication disconnection substantially at the same time. Due to this communication disconnection, the log information (underlined information) indicating a communication disconnection is recorded in the BMC log of the casing A and the BMC log of the casing C (refer to FIG. 10). In the related art, all the failure information including the log information indicating a communication disconnection due to an immediate power disconnection was transmitted to the failure management server, and thus a high load was imposed on the failure management server and the network. However, with the information processing apparatus 1 according to the embodiment, transmission of the failure information (the log information indicating a communication disconnection due to an immediate power disconnection) is suppressed, and it becomes possible to reduce the load on the failure management server and the network.

Figure 10:
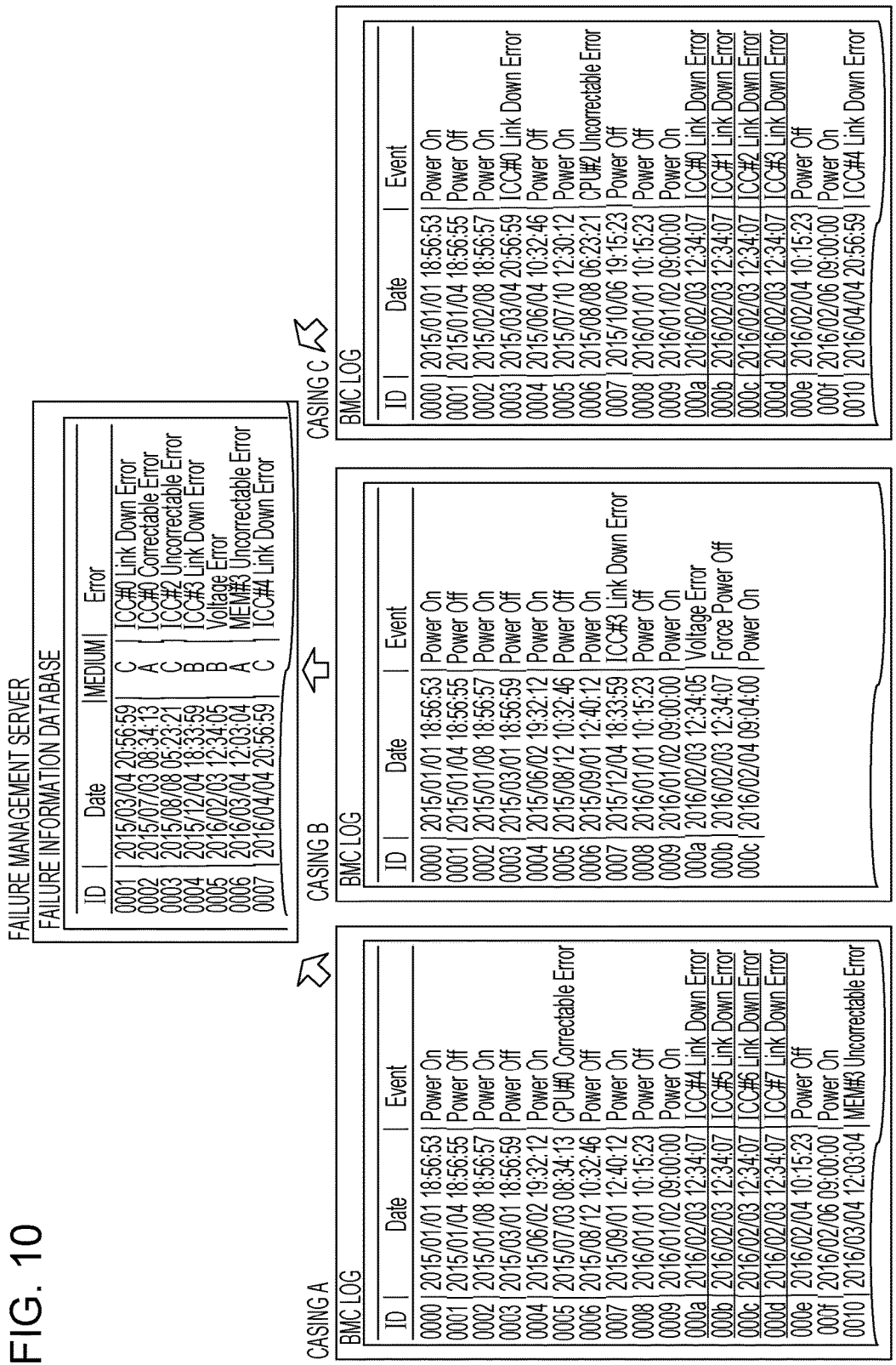
FIG. 10 is a diagram illustrating a database in which a BMC log in each casing and collected failure information are stored.

In this regard, in the failure information database illustrated in FIG. 10, the log information indicating a communication disconnection due to an immediate power disconnection is not recorded. However, the log information indicating a communication disconnection not due to an immediate power disconnection, for example, the log information of the IDs of 0001, 0004, and 0007 is the target of transmission to the failure management server, and thus is recorded.

Figure 11:
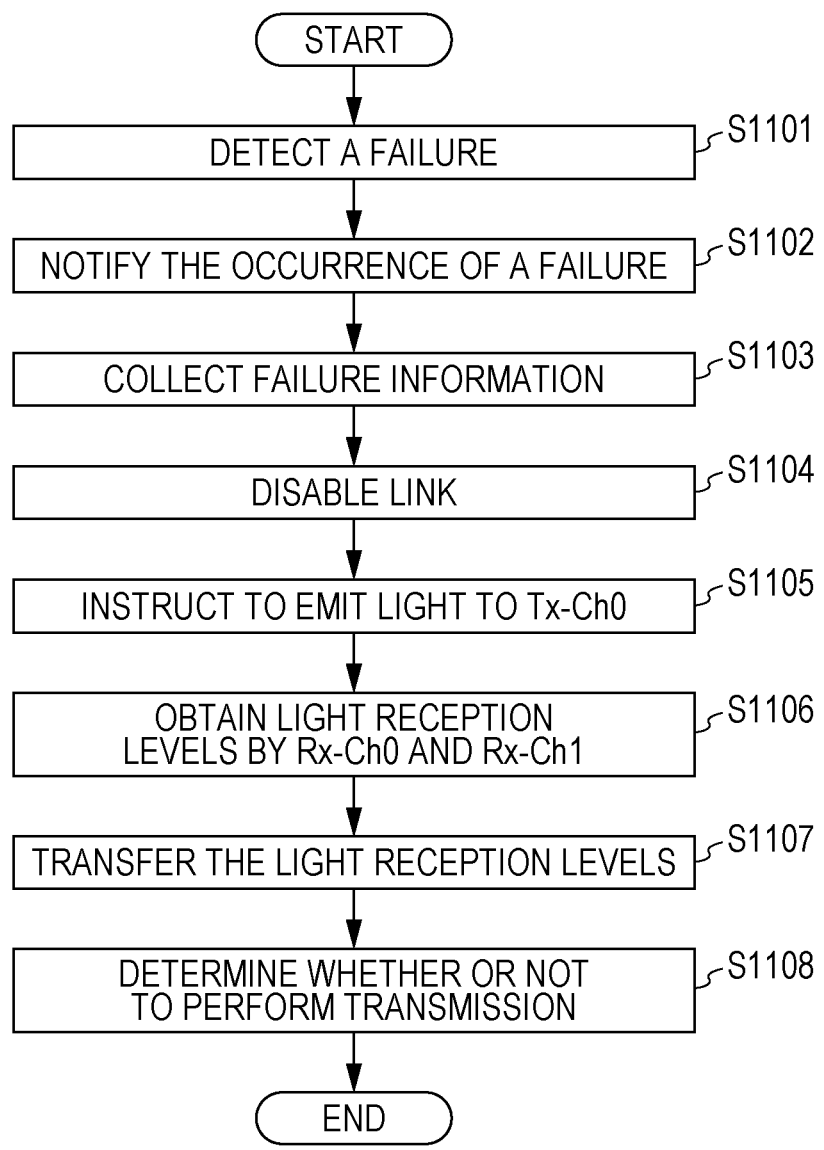
FIG. 11 is a flowchart illustrating the determination of whether to transmit failure information in an information processing apparatus according to the embodiment.

Next, a description will be given of an example of a whether to transmit failure information determination flow performed by the information processing apparatus 1 according to the embodiment with reference to FIG. 11. First, although an ICC in a certain casing is not aware of whether a failure is due to an immediate power disconnection of the casing of an adjacent coupling destination or a hardware failure (an ICC failure, or the like) of the casing of the adjacent coupling destination at this point in time, the ICC detects some failure (error) (step S1101). The ICC detects the failure, and thus notifies the BMC of the occurrence of the failure (step S1102). The BMC (BMC firm) that has received the failure occurrence collects the failure information, for example, the hardware register information, and the like (step S1103). The ICC disables the link with the casing in which the failure has been detected (step S1104). At this time, the ICC also instructs the optical module to stop light emission.

When the optical module control section 13 receives a notification (link disabling completion notification) of completion of disabling the link from the ICC, the optical module control section 13 instructs the light emission element of the transmission channel (for example, Tx-Ch0) of the optical module to emit light (step S1105). Also, the optical module control section 13 obtains (collects) the information of the light reception levels of the light receiving element of the reception channel (Rx-Ch0 and Rx-Ch1) from the status register of the optical module after the lapse of a certain time period from the completion of the light emission instruction (step S1106). The optical module control section 13 transfers the information on the light reception levels of the light receiving elements of the obtained reception channel to the whether-to-transmit failure information determination section 14 (step S1107).

The whether-to-transmit failure information determination section 14 compares the transferred information of the light reception levels of the light receiving element of the reception channels with threshold values of light reception determination so as to determine whether or not the power source of the casing of the adjacent coupling destination is off in order to determine whether or not to transmit the failure information (step S1108). For example, if the light receiving element of the reception channel (Rx-Ch0) does not receive light, whereas the light receiving element of the reception channel (Rx-Ch1) receives light, the power source of the casing of the adjacent coupling destination is off (due to an immediate power disconnection), and thus it is determined that the failure information does not have to be transmitted.

With the information processing apparatus 1 according to one aspect of the embodiment, transmission of the failure information, which is caused by an immediate power disconnection and is dispensable, is suppressed. Accordingly, it becomes possible to reduce the load of the failure management server and the network.

In this regard, the inter-node communication control section 11, the optical communication control section 12, the optical module control section 13, the whether-to-transmit failure information determination section 14, and the failure information control section 15 or any combination thereof may be configured by one processor. The processor may be a multiprocessor. The processor may be, for example, a central processing unit (CPU), a micro processing unit (MPU), or a digital signal processor (DSP). Any one of the functions that are realized by execution of a program by the processor or any combination thereof may be realized by an electronic circuit, such as an application specific integrated circuit (ASIC), a programmable logic device (PLD), or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
    an optical transceiver configured to return an optical signal received by a first channel to a second channel at a time of immediate power disconnection of a casing accommodating nodes;
    a memory; and
    a processor coupled to the memory,
    wherein the processor detects an occurrence of a failure in inter-node communications with an external node,
    when the occurrence of the failure is detected, the processor controls the optical transceiver in order to emit light to the first channel, makes a determination as to whether or not the second channel is enabled to receive the optical signal, and determines whether or not a power source of the external node is off based on the determination, and
    when the power source of the external node is off, the processor selects a failure notification to transmit to a failure management device.

2. The information processing apparatus according to claim 1,
    wherein the processor further determines reception of the optical signal by the first channel, and determines whether or not the power source of the external node is off based on a reception determination of the optical signal by the first channel and a reception determination of the optical signal by the second channel.

3. The information processing apparatus according to claim 1,
    wherein the processor compares a light reception level of the optical signal by the first channel and a light reception level of the optical signal by the second channel with respective light reception determination threshold values to be used for determining whether or not light is received, and the processor determines reception of the optical signal by each channel based on a comparison result.

4. The information processing apparatus according to claim 1,
    wherein the optical transceiver includes a potassium tantalate niobate crystal (KTN crystal), and a signal received by the first channel is returned to the second channel by applying no voltage to the KTN crystal.

5. In an information processing apparatus configured to transmit failure information to a failure management device, a method of determining whether or not to transmit the failure information, the method comprising:
    detecting an occurrence of a failure in inter-node communications with an external node;
    when a failure occurrence notification notifying the occurrence of the failure is received, controlling an optical transceiver configured to return an optical signal received by a first channel to a second channel at a time of immediate power disconnection of a casing accommodating nodes in order to emit light to the first channel of the optical transceiver, making a determination as to whether or not the second channel is enabled to receive the optical signal, and determining whether or not a power source of the external node is off based on the determination, and when the power source of the external node is off, selecting a failure notification to the failure management device.

6. The method of determining according to claim 5, wherein reception of the optical signal by the first channel is further determined, and whether or not the power source of the external node is off is determined based on a reception determination of the optical signal by the first channel and a reception determination of the optical signal by the second channel.

7. The method of determining according to claim 5, wherein a light reception level of the optical signal by the first channel and a light reception level of the optical signal by the second channel is compared with respective light reception determination threshold values to be used for determining whether or not light is received, and reception of the optical signal by each channel is determined based on a comparison result.

8. The method of determining according to claim 5, wherein the optical transceiver includes a KTN crystal, and a signal received by the first channel is returned to the second channel by applying no voltage to the KTN crystal.

9. An information processing apparatus comprising:
a first casing housing the information processing apparatus and in communication with at least one second casing;
an interconnect controller (ICC) configured to detect a failure in a communication with the information processing apparatus;
an optical transceiver in communication with the ICC using a plurality of channels; and
a processor in communication with the ICC and the optical transceiver;
when the occurrence of the failure is detected:
controlling the optical transceiver to emit light to a first channel,
determining whether a second channel is enabled to receive the optical signal, and
determining whether a power source of the at least one second casing is off based on the determining whether the second channel is enabled, and
when a determination is made that the power source of the at least one second casing is off, selecting a failure notification to transmit to a failure management device.

10. The information processing apparatus of claim 9, further comprising a baseboard management controller (BMC) in communication with the processor.

11. The information processing apparatus of claim 10, wherein, when the ICC detects the failure, the ICC transmits a notification of the failure to the BMC.

12. The information processing apparatus of claim 11, wherein, after receiving the notification, the BMC collects failure information.

13. The information processing apparatus of claim 9, wherein the ICC disables a link for the at least one second casing in which the failure has occurred.

14. The information processing apparatus of claim 13, wherein the ICC transmits a notification to the optical transceiver to stop light emission.

15. The information processing apparatus of claim 14, wherein the optical transceiver emits light on a transmission channel.

16. The information processing apparatus of claim 15, wherein the determining whether the power source is off includes collecting reception level information regarding light reception levels of a reception channel.

17. The information processing apparatus of claim 16, wherein the determining whether the power source is off includes comparing the reception level information with at least one reception level threshold value.

* * * * *